Aug. 28, 1934.  E. J. BLISS ET AL  1,971,954
FOOT MEASURING AND RECORDING MACHINE
Filed May 23, 1930
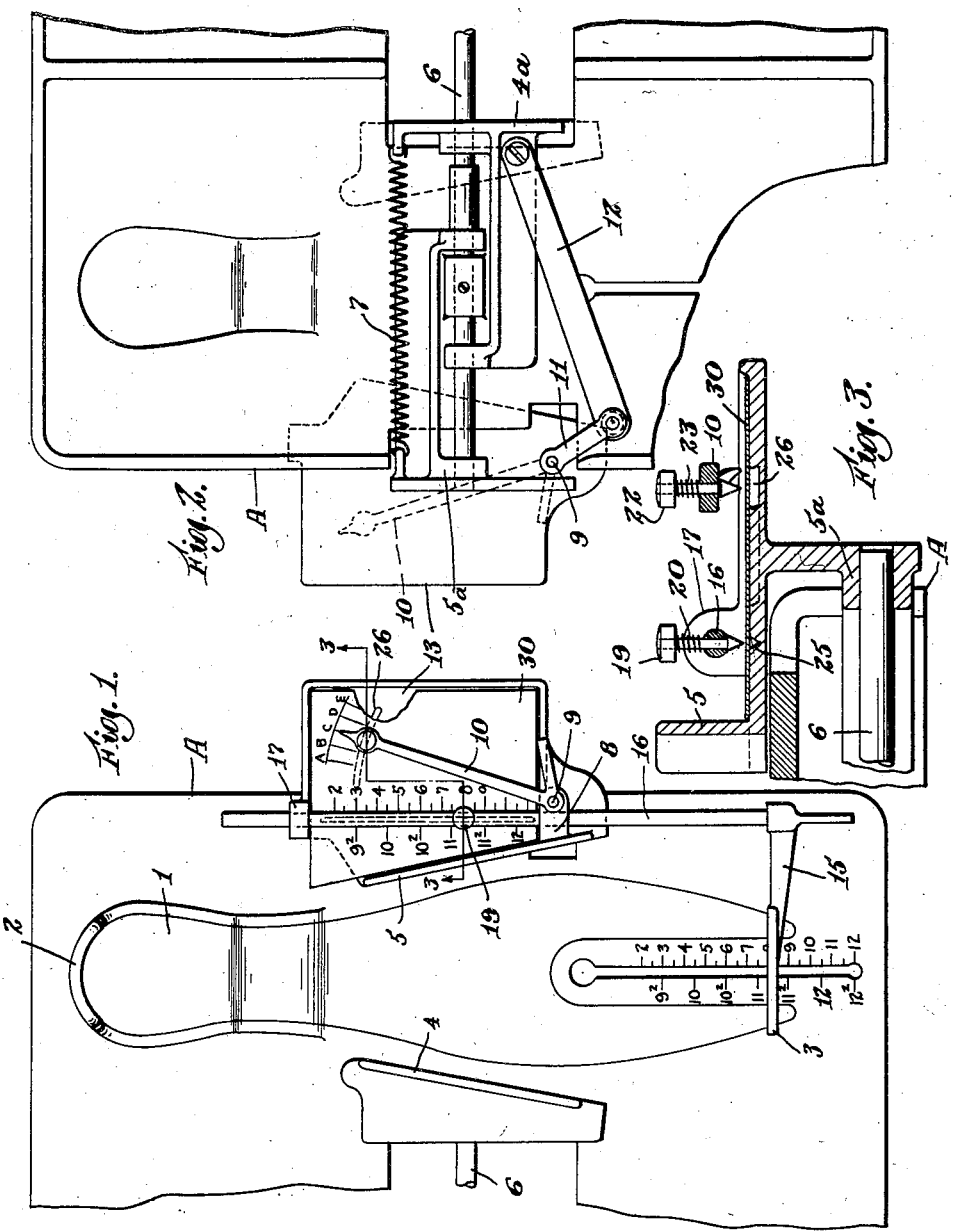
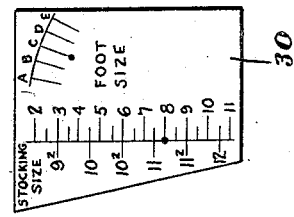
Inventors
E. J. Bliss
C. E. Clarke
by
Geo. N. Goddard, Attorney Patented Aug. 28, 1934

1,971,954

UNITED STATES PATENT OFFICE 1,971,954

FOOT MEASURING AND RECORDING MACHINE

Elmer J. Bliss, Boston, and Charles E. Clarke, Winthrop, Mass., assignors to Regal Shoe Company, Whitman, Mass., a corporation of Massachusetts Application May 23, 1930, Serial No. 455,082

7 Claims. (Cl. 33—3)

This invention relates to a machine for fitting shoes such as is used in shoe stores to ascertain, by proper measurement of the customer's foot, the size of shoe that is appropriate for the individual customer being measured.

In the United States patent to E. J. Bliss No. 1,426,143 dated August 15, 1922, there was illustrated a mechanism for correctly ascertaining not only the length-size of the foot to be fitted, but also the ball width of such foot in coordination with its length. Furthermore, in the Bliss Patent No. 1,745,144 dated January 28, 1930, there was shown a complete shoe fitting apparatus in which two such foot measuring machines were mounted side by side on a common platform, so that both feet could be measured at the same time while the customer is standing up so that each foot might be measured in expanded or extended position while bearing the weight of the person.

The present invention contains an improvement by means of which the foot measuring mechanism, shown in the aforesaid Letters Patent, may be operated to produce a permanent record of the foot size measurements taken by the machine.

In general, the invention comprises, in combination with a foot support or base, length-size and width-size gauges connected with suitable indicators or pointers movable over length-size and width-size scales, respectively, said pointers being operable in their various measuring positions to mark on a size scale card properly positioned in the machine the width-size and length-size indications furnished by the machine. This and other features of the invention will be particularly described in the following specification and will be defined in the claims hereto annexed.

In the drawing is shown a simple and effective arrangement and construction embodying the principles of the present invention as applied to the type of measuring mechanism disclosed in the above-mentioned Letters Patent, in which Fig. 1 is a plan view of a single measuring machine equipped with the present improvement.

Fig. 2 is a bottom plan view of the under part of the width-size measuring mechanism through which the width-size or lateral gauges are caused to move the pointer over the width-size scale.

Fig. 3 is a vertical section taken on the angular plane indicated by section line 3—3 of Fig. 1.

Fig. 4 is a plan view of the size-scale card on which the permanent record of the measurement is fixed.

In the practice of this invention according to the specific form herein illustrated, the platform $a$ is provided with an appropriate portion having a slightly raised heel support 1 and back rest or gauge 2 for the reception and support of one foot to be measured. The forward end of the platform or base $a$ is provided with a longitudinal slot having on its right hand side, as viewed in Fig. 1, a foot-size scale and on its left hand side a stocking-size scale similar to that shown in the Bliss Patent No. 1,426,143. Along and above this slot travels an upraised toe gauge 3, which can be shifted to come into light contact with the tip of the great toe.

The side gauges 4 and 5 are forwardly flared or inclined at predetermined angles, as explained in the aforesaid Bliss patent, to give correct width measurements in association with the ball length of the foot. These movable width gauges are supported, respectively, by brackets or carriers $4^a$ and $5^a$ which have perforated ears sliding on a fixed track bar 6 to permit each gauge to be adjusted into proper gauging contact with the adjacent side of the interposed foot. The gauges are normally drawn toward each other by a tensioning spring 7, so as to bring them with a uniform gauging pressure against the opposite sides of the ball of the foot.

One of these side gauges 5 is provided with an outward extension or ear 8, in which is mounted a vertical rock spindle or rock shaft 9, to whose upper end is secured the indicator arm 10. To the underside of this rock shaft 9 is secured a link 11 having pivotal connection through a connecting link 12 with the bracket $4^a$ of the opposite gauge member, so that as the gauges are opened apart or separated from each other the indicator arm 10 travels outwardly over the width-size scale, which is marked on a horizontal table or shelf 13 that is also secured to the gauge member 5 and moves transversely therewith.

The longitudinally movable toe gauge 3 is provided with a lateral arm 15, to which is secured a rearwardly extending rod 16 that passes through a horizontal opening in the ear 8 and also through a horizontal opening in an ear or boss 17, that is integral with the rear end of the table or plate 13, on which table or plate is marked not only the width-size scale in somewhat arcuate form adjacent the extreme tip of the indicator arm 10, but also carries a foot-size scale along one side of the toe gauge slide bar 16 and may also carry a stocking-size gauge on the opposite side of said bar.

The toe gauge slide bar 16 carries in appropriate relationship to the longitudinal scales on the scale plate 13 a pointed plunger 19, which is normally raised by a compressed spring 20 but which can be pressed down to indent or perforate an underneath card placed on the scale plate 13.

In similar fashion the outer or free end of the indicator arm 10 has a pointed plunger 22 normally raised by a compression spring 23, which can be forced down to perforate or indent an underneath size-recording card.

To facilitate perforation of the card, the plate 13 is provided with a shallow groove or slot 25 arranged directly beneath the slide bar 16. An arcuate groove 26 underlies the tip of the pointer 22 to serve a similar purpose.

The size-recording card is shown in Fig. 4. It contains two side by side longitudinal scales, the right hand one indicating foot-sizes, the left hand one indicating stocking-sizes. It also bears a printed width-size scale in the rear right hand corner which, when the card is positioned on the scale plate or shelf 13, coincides with the width-size scale marked on the plate 13.

The side gauges will be positioned according to the ball width of the interposed foot and the distance of the ball of the foot from the heel stop or gauge 2. The toe gauge is then moved into gauging contact with the tip of the great toe while the length-size pointer 19 partakes of this same movement, whereby the length-size marking pointer 19 is positioned on the two longitudinal scales in the same relationship as is the toe gauge on the scales at the front end of the foot supporting platform or base.

The side gauges likewise are adjusted to gauging contact with opposite sides of the ball portion of the foot and according to the degree of their separation the width-indicating arm 10 is moved across the printed width scale on the recording card, which has been inserted beneath the two marking pointers, so that the length-size and the width-size indications can be read on the card. While the marking pointers are in their respective foot gauging positions they are pressed down to perforate or indent the record card 30, thus affording a permanent marking or indication on the card of the correct measurements of the foot.

This card may be removed and placed on file with the name of the customer and a fresh card substituted for measuring others, so that the machine directly records on the record card the actual measurement of the foot being measured.

It will be noticed that this machine operates to directly translate the length and the width gauging positions of the gauges directly into readings in terms of standard foot-size or shoe-size measuring symbols, since not only does the length-size scale on the card consist of the length-size numerals in consecutive order properly spaced apart, but the width-size readings designated by the width indicating recording pointer as it moves over the card also gives direct width-size readings in the standard width-size symbols, whether the more common letters, or the less commonly used corresponding numerals. This is very important because if merely a parallel ruled chart be used it is necessary for the salesman, or measurer, to count the number of spaces across the width of the foot and then consult a table of dimensional measurements and directions to ascertain what particular size-marked shoe in stock corresponds to the actual dimensional measurement for any predetermined length of foot. This involves time, mental operations and large chances of error which are eliminated by a measuring and recording machine that records in terms of the actual size-markings on the shoes in stock the size measurements of the foot. For example, if a foot of 7C size is being measured, the reading on the scale card will be 7C. This is due to the fact that the opposed independently movable width gauges are interconnected with an indicating and recording pointer on one of these gauges that is movable over the scale card also mounted on that same gauge member, so that the width gauges will indicate the proper width-size reading in correlation with the particular length of foot being measured, which reading is the direct designation of some particular size of shoe in stock.

As is well known to those familiar with shoe fitting, the same width-size symbols indicate different actual width dimensions according to the length of the foot; that is, width-size C is one-twelfth inch wider for a number 8 foot than it is for a number 7 foot, and two-twelfths inch wider than width-size C for a number 6 foot or a number 7C foot has the same actual dimensional width as a number 6D, or a number 8B, all of which is explained in applicant's aforesaid Letters Patent.

What we claim is:

1. The combination with a foot support extending longitudinally of the foot, of a longitudinally movable toe gauge, laterally movable width gauges, a scale plate secured to and movable with one of said width gauges and having a length-size scale and a width-size scale, length-indicating and width-indicating pointers connected, respectively, with the toe gauge and with the width gauges and movable along the respective length-size and width-size scales on said plate to indicate the length and width measurements of a foot in gauging contact with said gauges.

2. The combination of a foot support extending longitudinally of the foot, with a longitudinally movable toe gauge, laterally movable width gauges, a scale plate provided with a length size scale secured to one of said width gauges, a toe gauge connecting rod mounted in bearings carried by one of said laterally movable width gauges, and a pointer mounted on said connecting rod and movable over the length scale on said plate to indicate the length measurement of the foot being measured.

3. The combination with a foot support extending longitudinally of the foot, of a longitudinally movable toe gauge, a laterally movable width gauge, a scale plate secured to and movable with said width gauge and carrying a length-indicating scale, a longitudinally movable slide rod connected with said toe gauge and mounted above and laterally movable with said width gauge, a pointer on said slide rod arranged in coordination with said length scale to indicate the size length of the foot being measured in accordance with the gauging position of the toe gauge.

4. In a foot measuring machine, the combination with a foot support extending longitudinally of the foot, of a longitudinally movable toe gauge, a transversely movable width gauging member, a scale plate secured to said width gauge and carrying a longitudinally disposed length-size scale and also a width-size scale, separate size-indicating pointers interconnected respectively with the toe gauge and the width gauge to show size indications according to the foot gauging positions of said gauges.

5. The combination with a foot supporting base of a longitudinally movable length gauge and opposed width calipering gauges, each laterally movable independently of the other, a scale card provided with separate length size and width size indicating scales and mounted on one of said width calipering gauge members, recording pointers connected respectively with the length gauge and with said laterally movable gauges to be moved in correspondence with the movement of said gauges to gauging position over the respective length indicating and width indicating scales on said card, said pointers beng also movable against the card to punch a permanent indication of the length and width measurement of the foot on the card.

6. The combination with a foot support extending longitudinally of the foot, of a longitudinally movable length measuring toe gauge, width calipering gauges movable transversely of the foot independently of each other, size indicating punches interconnected respectively with the length and the width measuring gauges, a size scale card bearing separate length indicating and width indicating size scale symbols, said card being supported and positioned on one of said width gauges to locate the respective size scales in proper relation to the respective punches whereby the positioning of the gauges in measuring contact with the foot acts to position the punches in proper size recording relation to the respective size scales on said card.

7. In a machine for directly recording length and width size measurements of a foot, the combination with a foot supporting base extending longitudinally of the foot, of a length calipering gauge movable longitudinally of the base and width calipering gauges independently movable transversely thereof, a size marking pointer interconnected with the length gauge, another size marking pointer interconnected with both width gauges, said pointers being movable in correspondence with the movements of their respective gauges to size indicating positions, and a scale card bearing length and width size indicating symbols, said pointers being movable over and against the size scale card to record, in conjunction with the respective size scales on said card, permanent length and width size measurements of a foot being measured.

ELMER J. BLISS.
CHARLES E. CLARKE.